United States Patent
Bonamy et al.

(10) Patent No.: US 9,709,420 B2
(45) Date of Patent: Jul. 18, 2017

(54) RECONFIGURATION OF THE DISPLAY OF A FLIGHT PLAN FOR THE PILOTING OF AN AIRCRAFT

(71) Applicant: THALES, Courbevoie (FR)

(72) Inventors: Frederic Bonamy, Pessac (FR); Francois Coulmeau, Toulouse (FR); Celia Ebrard, Pessac (FR)

(73) Assignee: Thales (FR)

( * ) Notice: Subject to any disclaimer, the term of this patent is extended or adjusted under 35 U.S.C. 154(b) by 0 days.

(21) Appl. No.: 14/717,993

(22) Filed: May 20, 2015

(65) Prior Publication Data
US 2015/0338237 A1 Nov. 26, 2015

(30) Foreign Application Priority Data

May 23, 2014 (FR) ..................................... 14 01177

(51) Int. Cl.
*G01C 23/00* (2006.01)
*G08G 5/00* (2006.01)

(52) U.S. Cl.
CPC ......... *G01C 23/005* (2013.01); *G08G 5/0021* (2013.01)

(58) Field of Classification Search
CPC .... G08G 5/025; G08G 5/0013; G08G 5/0021; G08G 5/065; G01C 23/005
USPC ......... 340/973, 971; 345/660, 661, 619, 629
See application file for complete search history.

(56) References Cited

U.S. PATENT DOCUMENTS

| 5,340,061 A * | 8/1994 | Vaquier ............... G08G 5/0021 340/995.26 |
| 7,230,632 B2 * | 6/2007 | Coldefy ............... G08G 5/0013 345/619 |
| 7,345,693 B2 * | 3/2008 | Coldefy ............... G08G 5/0013 345/660 |
| 8,918,271 B2 * | 12/2014 | Pendry ................ G08G 5/0034 340/945 |
| 2014/0074323 A1 | 3/2014 | Andre et al. |

FOREIGN PATENT DOCUMENTS

| EP | 2362183 A2 | 8/2011 |
| FR | 2910678 A1 | 6/2008 |

* cited by examiner

*Primary Examiner* — John A Tweel, Jr.
(74) *Attorney, Agent, or Firm* — Baker Hostetler LLP (57) ABSTRACT

A method implemented by computer for the display of information relating to the flight of an aircraft comprises receiving indication of a selection of an arbitrary display zone on a screen of an onboard computer of the aircraft; and reconfiguring the display, in response to the indication. Developments describe several geometric transformations, various display reconfigurations (e.g. centering of the display), the use of systems third party to the aircraft (e.g. taxiing computer, ground client, maintenance, terrain monitoring, traffic, weather), associated operations of revisions of the flight plan, the use of display rules (notably associated with the flight situation), and the emergency deactivation of the display reconfigurations. Computer programs and associated systems are also described (notably Man-System Interface, virtual and/or augmented reality).

23 Claims, 6 Drawing Sheets

PRIOR ART

FIG. 3B

PRIOR ART

RECONFIGURATION OF THE DISPLAY OF A FLIGHT PLAN FOR THE PILOTING OF AN AIRCRAFT

CROSS-REFERENCE TO RELATED APPLICATION

This application claims priority to foreign French patent application No. FR 1401177, filed on May 23, 2014, the disclosure of which is incorporated by reference in its entirety.

FIELD OF THE INVENTION

The invention relates to techniques of display in the flight cabin of an aircraft and details in particular the choice of the centring of the graphical display zone.

BACKGROUND

Currently, the pilot of an aircraft can choose display zones on the screens of the CDS (for Cockpit Display System) onboard computer present within the cockpit by using the position of the aeroplane, or a particular point defined as "MRP" (the acronym standing for "Map Reference Point") defining the waypoint (point in 2D, Latitude/Longitude) of reference of the flight plan.

A so-called "SLEW" mode makes it possible to change the display reference by sliding the map by "dragging". This current display solution by sliding or by dragging greatly limits the display of information on the screens of the onboard computer since the elements must be situated around the aeroplane or around a point of the flight plan.

Tiresome manipulations must be performed by the pilot if he wishes to have access to other views. These aspects give rise to a cognitive overload of the pilot, that is prejudicial to his fatigue and therefore to flight safety.

There exists a need for advanced schemes and systems for managing the onboard display of an aircraft or of the flight cabin of a drone.

SUMMARY OF THE INVENTION

There is disclosed a method implemented by computer for the display of information relating to the flight of an aircraft comprising the steps of receiving indication of a selection of an arbitrary display zone on a screen of an onboard computer of the aircraft; and of reconfiguring the display, in response to the said indication.

The invention as defined remedies the current impossibility of selecting an arbitrary element of a screen embedded in an aircraft cockpit. Existing systems do not make it possible to select an "arbitrary" zone of a screen embedded in the cockpit but only, for example, predefined points such as waypoints on a map representing the flight trajectory of the aircraft. Specifically, today the CDS can be centred only on the aeroplane depiction or on a point of the FMS flight plan positioned particularly on another FMD screen. The term "arbitrary" signifies (according to case) "unconstrained" or "non-predefined" or "free" or "freely chosen" or "not limited to predefined choices" or "not imposed by an underlying information system". This term may be omitted (it is not essential).

By contrast, the free selection according to the invention has multiple repercussions on the display systems and the upstream systems connected to the display systems. Stated otherwise, profound changes must or may be made to the architecture of the information system. In addition to the selection of an arbitrary, that is to say freely chosen, point or element, various aspects and examples of reconfiguration of the display are presently disclosed.

The selection of one or more elements of one or more displays will generally come from the pilot but might also result from automatic operations (e.g. continuous evaluation of the flight situation by the machine, and selection of certain elements without the necessity of associated visual rendition, etc). The selection operations could be hybrid, i.e. partially human and partially machine (for example by means of logical rules).

According to one aspect of the invention, the method comprises steps making it possible to reconfigure the display of one or more screens in the flight cabin (or remote flight cabin in the case of a drone).

The display zone can be a surface of the screen (i.e. not pointlike) or a portion of the screen or else a discrete point of the screen. The selection can be performed in various ways, which are optionally combined. For example, the selection can be done by touch-sensitive designation and/or by voice control (e.g. confirmation) and/or by thumbwheel/mouse/trackpad, etc.

In a development, the step of reconfiguring the display comprises one or more geometric transformations of at least one portion of the display, the said geometric transformations being chosen from among a displacement, an isometry, a similarity, an affine transformation, a homographic transformation, and/or an inversion.

The display zone as designated or selected can for example be centred (or recentred) or else reconfigured in a predefined manner. The reconfiguration can comprise one or more geometric operations (conducted successively or taken in combination) chosen from among: a displacement (preserving distances and oriented angles), an isometry (preserving distances and angles), a similarity (preserving distance ratios), an affine transformation (preserving parallelisms), a homographic transformation (preserving straight lines), and an inversion (preserving all straight lines and circles in the plane case).

In practice, the display will be able to be reframed ("cropped"), magnified, reduced, zoomed, deformed, recoloured, shifted, the contrast adapted, etc, in all or part (e.g. the entire image or only image sub-parts) of the display. The zoom values can be static or dynamic. The pilot for example can control the value of magnification or "range" via selectors/rotary knobs to zoom and de-zoom on his ND displays.

A reconfiguration can also comprise one or more bidifferentiable transformations (or diffeomorphisms), conformal or anticonformal transformations (preserving angles), equivalent or equiareal transformations (preserving areas in the plane case), bicontinuous transformations or homeomorphisms (preserving neighbourhoods of points), displacements (reflections, central symmetries, translations, rotations), homotheties, affinities, etc.

In one embodiment, the reconfiguration of the display comprises a step of "centring" with respect to the point or the zone selected.

In one embodiment, the mode of reconfigured graphical display is carried out on the so-called ND screen in a mode dubbed "DATA_PLAN" making it possible to reference or centre or reconfigure the active display zone (such as displayed to the pilot) with respect to an element designated by the pilot (via the FMD or via the NTD or by means of another item of equipment present in the cockpit, e.g. voice control).

In a development, the step of reconfiguring the display consists in centring the display.

In one embodiment, the reconfiguration of the display comprises a step of "centring" with respect to a predefined point, previously associated with the point or with the preselected zone. For example, one of the corners of the screen if it is selected can trigger a display centred on the point representing the current situation of the aeroplane, while the selection of another corner of the screen will correspond to the situation of the next change of flight level. Zones can therefore be defined in either absolute (i.e. with respect to the screen) or relative (i.e. with respect to the map or MAP) association. The zones can be delimited by linear or curved limits (geographical zones or voxels in the case of 3D). In one embodiment, the display can be centred with respect to another point defined previously, in a static manner in a file or a database.

The operation of centring the display can be performed with respect to the centre of the screen, but not solely.

In a development, the step of reconfiguring the display comprises a step of reconfiguring the display with respect to a predefined zone associated with the selected zone.

For example, the display can be reconfigured with respect to a point close to the centre, in such a way that a maximum number of elements of the flight plan (for example in the range displayed) are still displayed. The reconfiguration can also take as reference point a different geographical point from the one that was selected (i.e. a predefined zone, previously associated with the predefined zone).

In a development, the predefined zone is or corresponds to the selected zone.

In the general case, the predefined zone and the selected zone are distinct. In a particular case, there is identity between these two zones. In a particular embodiment, the display or screen zone or portion designated or selected by the pilot can be an element of the DUPLICATE page, or an element of the FPLN page, or else an element related to the pages Data_x (x=Waypoint, Navaid, Runway, route) for consulting the navigation database (or an element designated by another system, as specified subsequently).

In a development, the display zone is associated with a third party system to the aircraft.

According to one aspect of the invention, the reconfiguration of the display (e.g. centring) can be done on the basis of an element originating from any other system whatsoever, third party to the aircraft, i.e. not belonging to the onboard systems. This embodiment singles out the fact that an arbitrary graphical element may be selected.

The correspondence between the selected zone (portion of the graphical display) and an element originating from another system (i.e. third party) can be effected in several ways. This correspondence can be established "a priori", i.e. the correspondence is established in a prior manner, or else "a posteriori" i.e. after designation proper. By way of example, on the ND may be displayed a weather element such as a cloud detected by an onboard weather computer, the radar echo of an aeroplane in proximity such as received by the TCAS traffic computer, a geographical element such as a town displayed by an EFB or a tablet, a terrain element arising from a terrain monitoring computer, etc.

In a development, the system third party to the aircraft is a system chosen from among a ground taxiing computer, a ground client item of equipment, a maintenance item of equipment, a terrain and/or traffic monitoring system and/or a meteorological system.

In future, several third party systems might interact with onboard systems, i.e. might be accessible via MIMI display interfaces, either by using existing public services, or by using existing private services, or finally by using new services. It is possible to cite for example (a) the initialization of the FMS flight plan by an external computer (touch-sensitive tablet or Electronic Flight Bag (EFB)); (b) the integration of the "flight plan" of the FMS with the "taxiing plan" of the ground taxiing computer (called ANF for Airport Navigation Function, AOF for Airport Onboard Function or TAXI or AMM for Airport Moving Map); (c) the optimization of the mission, called by a ground client (company tool for example) or aboard (tablet, EFB) via FMS computation requests; (d) the updating of the FMS software (in particular its Navigation databases, on a 28-day cycle) by a third party item of equipment (tablet, maintenance tool, EFB); (e) the use of FMS requests by a terrain, traffic, and/or weather monitoring system to filter alerts, or to confirm them, or to optimize lateral and vertical adjustments (for example for the avoidance of a moving cloud mass detected by a Weather Radar). The traffic monitoring system is known by the acronym TCAS (Traffic Collision Avoidance System) or Traffic Computer. The terrain monitoring system is known by the acronym TAWS (Terrain Avoidance Warning System) or GPWS (Ground Proximity warning system). The weather monitoring system is known by the acronym WxR (Weather Radar); (f) the use of FMS requests to aid the triggering of events on a third party system (for example modification of the radio frequency by the RMS system (Radio Management System) when the aircraft approaches a point of change of region); (g) the verification of conformity of the lateral and/or vertical trajectory computed by the FMS, with respect to the digitized aeronautical maps provided to the crew (stored in a tablet, an EFB for example); (h) the use of the FMS system to ascertain predictions over a given time horizon according to defined modes of flight conduct (guidance) and of aeroplane state (for example, the automatic pilot wishing to ascertain the mean climb rate over 2000 feet of alteration of altitude with a faulty engine; fuel computer wishing to compare the average consumption with the FMS predictions of consumption, etc.); (i) the interactions with the FWS (Flight Warning System) to present results of verifications, propose automated launches of DO LIST, modify FMS states directly on confirmation of faults; Q) the passengers connected via their cabin interface (IFE for In Flight Entertainment).

In a development, the selected zone is a revision of the flight plan.

This advantageous embodiment allows an alteration of the flight plan revision tools. According to this mode, the method comprises a screen reconfiguration step which makes it possible to perform a shortcut for certain functions or to create new functions. The existing "ND PLAN" mode makes it possible to place the MRP at the centre of the display. In the present embodiment ("linking menu"), a point of the MAP is selected and the list of possible revisions is displayed. After selection of one of the possible revisions, the display is reconfigured around this point.

In a development, the method furthermore comprises a step of receiving an instruction for deletion and/or for insertion of the said flight plan revision.

According to this development, the "linking menu" can make it possible to insert the MRP into the flight plan in relation to the element of the flight plan selected (before/after) or to replace the element of the flight plan selected by the MRP.

In a development, the step of reconfiguring the display comprises the application of display rules.

The reconfiguration can also be dynamic and/or complex (for example result from the application of rules).

In particular the rules can settle possible conflicts in case of collisions of instructions between absolute and relative associations (e.g. order of priority of the rules).

The reconfiguration of the display can be conditional, e.g. the rules can comprise tests and/or verifications. The rules may take parameters of avionics and/or non-avionics type. For example, the various phases of the flight plan (takeoff, cruising or landing), including according to a finer granularity, can be associated with different configuration/reconfiguration rules. For example, the needs in terms of display during takeoff are not the same as those during the cruising regime and the display can be reconfigured accordingly.

In a development, the method furthermore comprises a step of receiving an instruction for deactivating the reconfiguration of the display.

In one embodiment, the reconfiguration of the screen is "disengageable", i.e. the pilot can decide to cancel or to deactivate all the modifications of the display in progress and thus return rapidly to the "nominal" mode of display i.e. native mode of display without the said reconfiguration. Exit from the reconfiguration mode can for example be done by voice control (passphrase) or via an actuator (deactivation button). Various events can trigger this precipitate exit from the graphical reconfigurations in progress (for example "sequencing" of a waypoint, a change of flight phase, the detection of a major anomaly such as an engine fault, depressurization, etc).

In a development, the selection of the display zone is obtained by the inputting of an alphanumeric identifier.

According to the invention, it becomes possible for a point other than the position of the aeroplane to be taken as reference point in order to sort the list of "duplicates". An extended search of Wildcard type makes it possible firstly to input a part of the name of an element. The elements corresponding to this start of name are displayed (for example on the ND). The displayed elements can correspond to data of the FMS but also to other types of data (optionally merged), for example results originating from a search on the Internet or other network available aboard the aeroplane.

In one embodiment, an alphanumeric identifier is selected and then a results list (e.g. "reference points") is determined by means of this identifier, by comparison with one or more databases of onboard aeronautical elements, and then optionally displayed. A particular reference point is selected (for example by the pilot). Optionally a list of revisions is proposed. The reconfiguration of the display associated with the selection of the display point (or of a selected revision) is performed.

In detail, in an embodiment, a "duplicate" page appears if the list of "reference points" comprises at least two distinct elements. An additional and distinct identifier is appended to each element of the list. The elements of the list, and their additional identifiers, are displayed on the aeroplane display systems.

In a development, the selection of the display portion is performed by touch-sensitive selection and/or voice control. For example, the selections (and/or subsequent control operations) can be performed by means of graphical cursors, mouse, pad, trackball, joystick, airtouch, motion or gesture detection, haptic sensors, etc.

There is disclosed a computer program product, comprising code instructions making it possible to perform one or more steps of the method, when the said program is executed on a computer.

There is disclosed a system comprising means for implementing one or more steps of the method.

In a development, the system comprises means of avionics type, for example a Flight Management System and/or a ground taxiing computer (of "Airport Onboard Function" or "Airport Navigation Function" type). In this embodiment, means of avionics type (i.e. certified and/or regulated by the regulating authorities) are therefore used.

In a development, the system implementing one or more steps of the method comprises means of non-avionics type, for example one or more Electronic Flight Bag tablets. By way of supplement or substitution, non-avionics means ((i.e. non-certified and/or non-regulated by the regulating authorities) are therefore used. For example, the display reconfigurations can in certain cases be offloaded or switched to other types of apparatuses, for example surrounding EFBs or advanced display means).

In a development, the display screen or screens are screens of Man-System Interface type. In a particular embodiment, the FMS can be used via a DIA (Domain Interaction Agent) and/or an integrated MSI (Man—System Interface) which concentrates and organizes the exchanges between computers. The screens according to the invention can be the screens of the CDS (Cockpit Display System), i.e. comprising the screens of the FMS but not solely. Within the meaning of the invention, the display screen or screens can also comprise one or more screens of the FMS (avionics) and/or one or more EFB screens (possibly non-avionics), as well as screens of third party systems. In a "unified" perspective of man-machine interfaces, the graphical or visual interface presented to the pilot results from the integration of multiple screens, that is to say originating from different systems. The acronym MSI stresses this systemic perspective by contrast with the acronym MMI. Instead of compartmentalizing the display or maintaining the partitioning of the interfaces, integrated management of the display is conceivable for future piloting systems. Hence, optimizations can be implemented (the density of information can be configurable and/or alterable and/or controlled on the basis of rules, etc). The advantages in cognitive terms may be significant (optional redundancy of information, highlighting of certain information, adaptations to the flight context or indeed to personal preferences, deactivation of backup etc). The expression "screen of MSI type" therefore designates a screen considered according to such future systems, therefore involving an extra logic layer (rearrangement, for example dynamic rearrangement, of the displays) compared with the screens of existing systems.

In a development, the system comprises, by way of supplement to or substitution of the other means of display, means (for example of display) of augmented and/or virtual reality. These means (for the time being generally considered to be of "non-avionics" type) include notably virtual and/or augmented reality headsets, such as immersive viewing systems (e.g. videoheadsets, sights, head-mounted displays, glasses, projectors, etc.).

Advantageously, according to certain embodiments of the invention, the pilot decreases his cognitive load. He can as a corollary concentrate on the verification of the data. In particular, the pilot can centre his display on an arbitrary element of the terrestrial globe, other than an element of the flight plan (or of the current position of the aeroplane). Previously, to centre the display on a point of the flight plan, it was necessary for the pilot to pass to "PLAN" mode of display on the ND (head-level "Navigation Display" screen of the CDS, displaying the flight plan), and then to position the waypoint on the $2^{nd}$ line of the FPLN page of his head-down screen (MCDU for Multi Purpose Control Unit or FMD for FMS Management Display). This strung out procedure represents an overload of work for the pilot and forces him to change the mode of display on the ND. Another, more recent, mode of display exists, the SLEW mode, which makes it possible to slide the map by dragging. This mode nonetheless requires that the direction of the element sought be known and is not suitable for the display of a distant element in the flight plan. It does not make it possible to centre the map on an arbitrary element of the terrestrial globe. Moreover, the FMS system does not offer the pilot any simple means of controlling elements (called DUPLICATE) of the same name having a different position. These elements are currently grouped together on a DUPLICATE page of the FMD, and the pilot must search through the elements for the one that corresponds to the one which he wishes to use: the pilot is constrained to consult a paper or electronic map in order to verify the position of the element before selecting it. This leaves room for error and overloads the work of the pilot.

Advantageously, certain embodiments described make it possible to centre the display at an arbitrary point (for example one or more pixels e.g. with a geographical correspondence) thereby making it possible to aid the pilot during his interactions with the system. Graphical shortcuts for functions can be created. The pilot can view elements graphically before using them. The pilot therefore decreases his cognitive load, by being unburdened of tiresome verifications, and can concentrate further on the piloting proper.

The present invention will advantageously be implemented in a large variety of avionic environments, in particular for the presentation of information aboard the aircraft, on MMIs of CDS (Cockpit Display System) type, FMSs, taxiing systems (TAXI), onboard or ground mission systems for piloted or remotely-piloted aeroplanes or drones, EFBs (Electronic Flight Bags) or touch-sensitive tablets. It can also apply to the maritime or road context.

BRIEF DESCRIPTION OF THE DRAWINGS

Various aspects and advantages of the invention will appear in support of the description of a preferred but nonlimiting mode of implementation of the invention, with reference to the figures hereinbelow.

DETAILED DESCRIPTION

Certain technical terms and environments are defined hereinafter.

The acronym, or initials, FMS corresponds to the conventional terminology "Flight Management System" and designates the flight management systems of aircraft, known in the prior art through the international standard ARINC 702. During flight preparation or during rerouting, the crew undertakes the inputting of various items of information relating to the progress of the flight, typically by using an FMS aircraft flight management device. An FMS comprises input means and display means, as well as computation means. Via the input means, an operator, for example the pilot or the copilot, can input information such as RTAs, or "waypoints", associated with routing points, that is to say points vertically in line with which the aircraft must pass. These elements are known in the prior art through the international standard ARINC 424. The computation means make it possible notably to compute, on the basis of the flight plan comprising the list of waypoints, the trajectory of the aircraft, as a function of the geometry between the waypoints and/or altitude and speed conditions.

Hereinafter in the document, the acronym FMD is used to designate the textual display of the FMS present in the cockpit, generally disposed head-down (at the level of the pilot's knees). The FMD is organized into "pages" which are functional groupings of coherent information. These pages feature the "FPLN" page which presents the list of elements of the flight plan (waypoints, markers, pseudo waypoints) and the "DUPLICATE" page which presents the results of the navigation database searches.

The acronym ND is used to designate the graphical display of the FMS present in the cockpit, generally disposed at head-level, i.e. in front of the pilot's face. This display is defined by a reference point (centred or at the bottom of the display) and a range, defining the size of the display zone.

The acronym MMI corresponds to Man-Machine Interface (or equivalently, HMI, Human Machine Interface). The input of the information, and the display of the information input or computed by the display means, constitute such a man-machine interface. With known devices of FMS type, when the operator inputs a routing point, he does so via a dedicated display displayed by the display means. This display may optionally also display information relating to the temporal situation of the aircraft in relation to the routing point considered. The operator can then input and view a time constraint prescribed for this routing point. Generally, the MMI means allow the inputting and consultation of the flight plan information.

Figure 1:
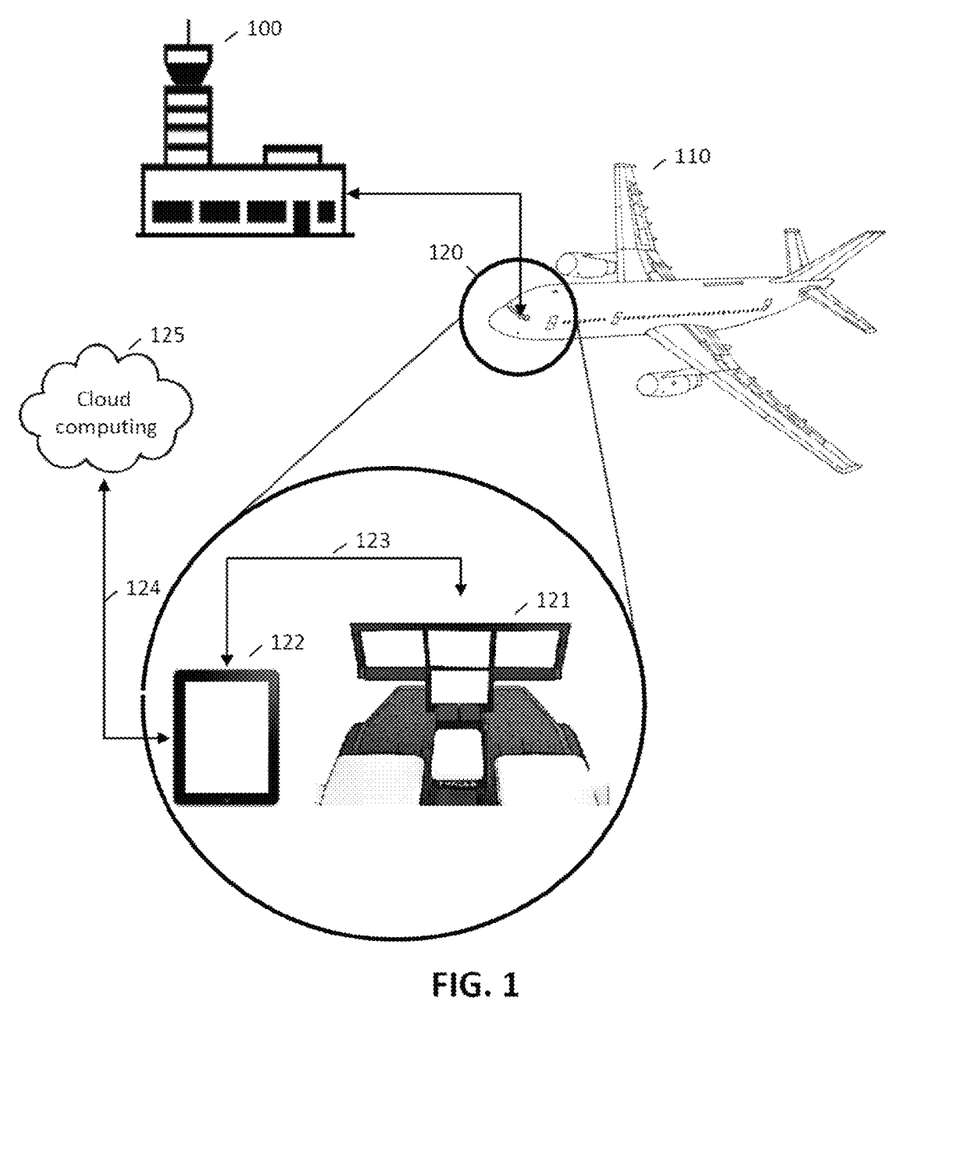
FIG. 1 illustrates the overall technical environment of the invention.

FIG. 1 illustrates the overall technical environment of the invention. Avionic equipment or airport means 100 (for example a control tower linked up with the air traffic control systems) are in communication with an aircraft 110. An aircraft is a transport means capable of moving around within the terrestrial atmosphere. For example, an aircraft can be an aeroplane or a helicopter (or else a drone). The aircraft comprises a flight cabin or a cockpit 120. Situated within the cockpit is piloting equipment 121 (termed avionic equipment), comprising for example one or more onboard computers (means of computing, saving and storing data), including an FMS, means of displaying or viewing and inputting data, communication means, as well as (optionally) haptic feedback means and a taxiing computer. A touch-sensitive tablet or an EFB 122 may be situated aboard, in a portable manner or integrated into the cockpit. The said EFB can interact (bilateral communication 123) with the avionic equipment 121. The EFB can also be in communication 124 with external computing resources, accessible through the network (for example cloud computing 125). In particular, the computations can be performed locally on the EFB or partially or totally in the computation means accessible through the network. The onboard equipment 121 is generally certified and regulated while the EFB 122 and the connected computing means 125 are generally not (or to a lesser extent). This architecture makes it possible to inject flexibility on the EFB 122 side while ensuring controlled safety on the onboard avionics 121 side.

Among the onboard equipment there feature various screens. The ND screens (graphical display associated with the FMS) are generally disposed in the primary field of view, at "head-level", while the FMDs are positioned "head-down". The set of information entered or computed by the FMS is grouped together on so-called FMD pages. Existing systems make it possible to navigate from page to page, but the size of the screens and the necessity of not placing too much information on a page for the readability thereof do not allow a summary overall assessment of the current and future situation of the flight. The cabin crews of modern aeroplanes generally consist of two people, distributed on either side of the cabin: a "pilot" side and a "copilot" side. Business aeroplanes sometimes have just a pilot, and certain older aeroplanes or military transport aeroplanes have a crew of three people. Each views on his MMI the pages of interest to him. Two pages from among the hundred or so possible are generally displayed permanently during the execution of the mission: the "flight plan" page first, which contains the information about the route followed by the aeroplane (list of the next waypoints with their associated predictions in terms of distance, time, altitude, speed, fuel, wind). The route is divided into procedures, themselves consisting of points (as described by patent FR2910678) and the "performance" page thereafter, which contains the useful parameters for guiding the aeroplane over the short term (speed to be followed, altitude ceilings, next changes of altitude). There also exists a multitude of other pages available onboard (the lateral and vertical revision pages, the information pages, pages specific to certain aircraft), i.e. generally a hundred or so pages.

The very large number of pages available sometimes renders access to the information difficult.

Figure 2:
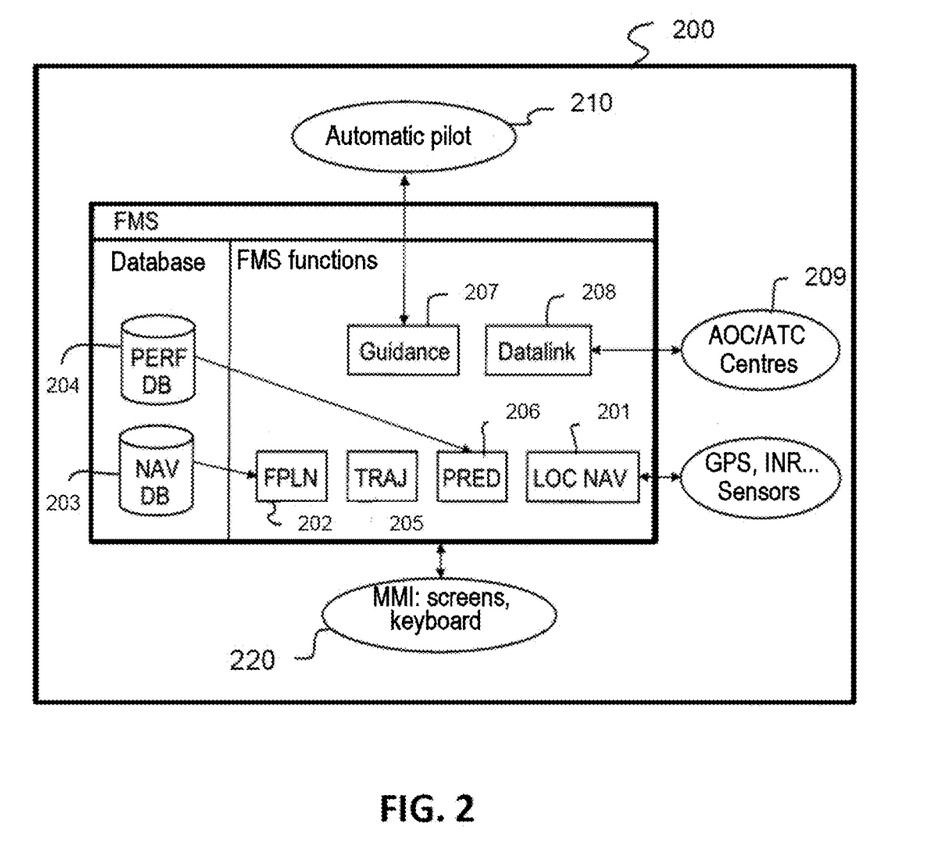
FIG. 2 schematically illustrates the structure and the functions of a flight management system of known FMS type.

FIG. 2 schematically illustrates the structure and the functions of a flight management system of known FMS type. A system of FMS type 200 disposed in the cockpit 120 and the avionics means 121 has a man-machine interface 220 comprising input means, for example formed by a keyboard, and display means, for example formed by a display screen, or else simply a touch-sensitive display screen, as well as at least the following functions:

Navigation (LOCNAV) 201, for performing the optimal location of the aircraft as a function of the geolocation means such as satellite-based or GPS or GALILEO geo-positioning, VHF radionavigation beacons and inertial platforms. This module communicates with the aforementioned geolocation devices;

Flight plan (FPLN) 202, for inputting the geographical elements constituting the "skeleton" of the route to be followed, such as the points imposed by the departure and arrival procedures, the routing points and the air corridors (or "airways" as they are commonly known). The methods and systems described affect or relate to this part of the computer. An FMS generally hosts several flight plans (the so-called "Active" flight plan on which the aeroplane is guided, the "temporary" flight plan making it possible to perform modifications without activating the guidance on this flight plan and (so-called "secondary") "inactive" work flight plans);

Navigation database (NAVDB) 203, for constructing geographical routes and procedures with the help of data included in the bases relating to the points, beacons, interception legs or altitude legs, etc;

Performance database, (PERFDB) 204, containing the craft's aerodynamic and engine parameters;

Lateral trajectory (TRAJ) 205, for constructing a continuous trajectory on the basis of the points of the flight plan, complying with the performance of the aircraft and the confinement constraints (RNAV for Area Navigation or RNP for Required Navigation Performance);

Predictions (PRED) 206, for constructing an optimized vertical profile on the lateral and vertical trajectory and giving the estimations of distance, time, altitude, speed, fuel and wind notably at each point, at each change of piloting parameter and at destination, which will be displayed to the crew. The methods and systems described affect or relate to this part of the computer.

Guidance (GUID) 207, for guiding in the lateral and vertical planes the aircraft on its three-dimensional trajectory, while optimizing its speed, with the aid of the information computed by the Predictions function 206. In an aircraft equipped with an automatic piloting device 210, the latter can exchange information with the guidance module 207;

Digital data link (DATALINK) 208 for exchanging flight information between the Flight plan/Predictions functions and the control centres or the various other aircraft 209.

one or more MMI screens 220. The set of information entered or computed by the FMS is grouped together on display screens (pages FMD, NTD and PFD, HUD or the like).

Figure 3A:
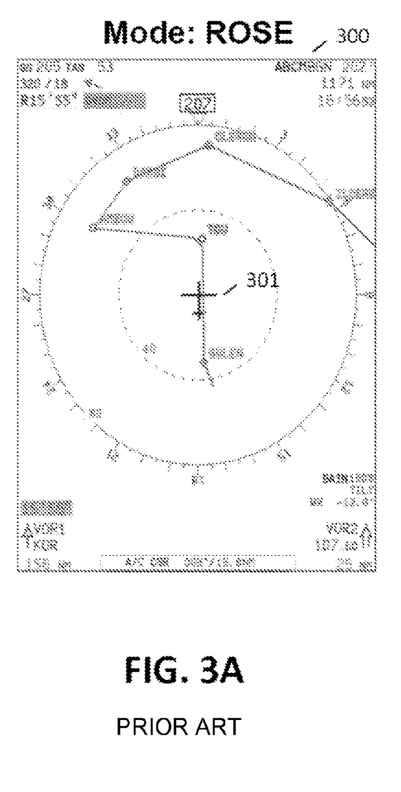
FIGS. 3A and 3B illustrate the operation of the screens of the FMS computer according to the prior art.
Figure 3B:
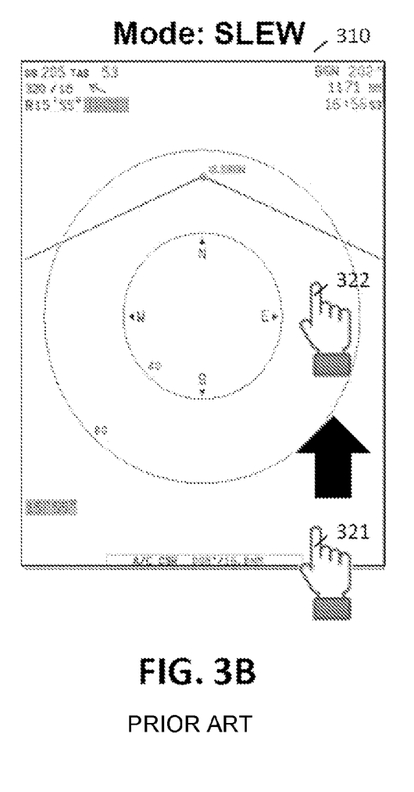

FIGS. 3A and 3B illustrate the operation of the screens of the FMS computer according to the prior art. Recall that, in current systems, the display can only be reconfigured with respect to a waypoint. This reference point corresponds either to the position of the aeroplane itself or to a point selected from among the other waypoints of the FMS flight plan. No other point can be selected directly in the prior art.

FIG. 3A shows the screen of a current FMS (for example an ND screen) in "ROSE" mode 300: in the example presented, the depiction is centred on the aeroplane and oriented along the aeroplane heading (the aeroplane 301 is in the middle of the screen). During the displacement of the aeroplane, the display remains centred on the aeroplane. An alternative so-called "ARC" view makes it possible to view what comes in front of the aeroplane (semicircle, always centred on the aeroplane).

FIG. 3B shows the same existing screen in "SLEW" mode 310: the screen is oriented North/East and can be manually displaced by dragging (here by application via a touch-sensitive interface) from a position 321 to 322 by the pilot. The SLEW mode of the ND also makes it possible to change the display reference by sliding the map. This SLEW mode nonetheless requires that the direction of the element sought be known. It is not suitable for the display of a distant element in the flight plan. The "SLEW" mode is a particularization of the "PLAN" mode also oriented North/East and centred on the point corresponding to the $2^{nd}$ line of the "FPLN" FMD page.

Figure 4:
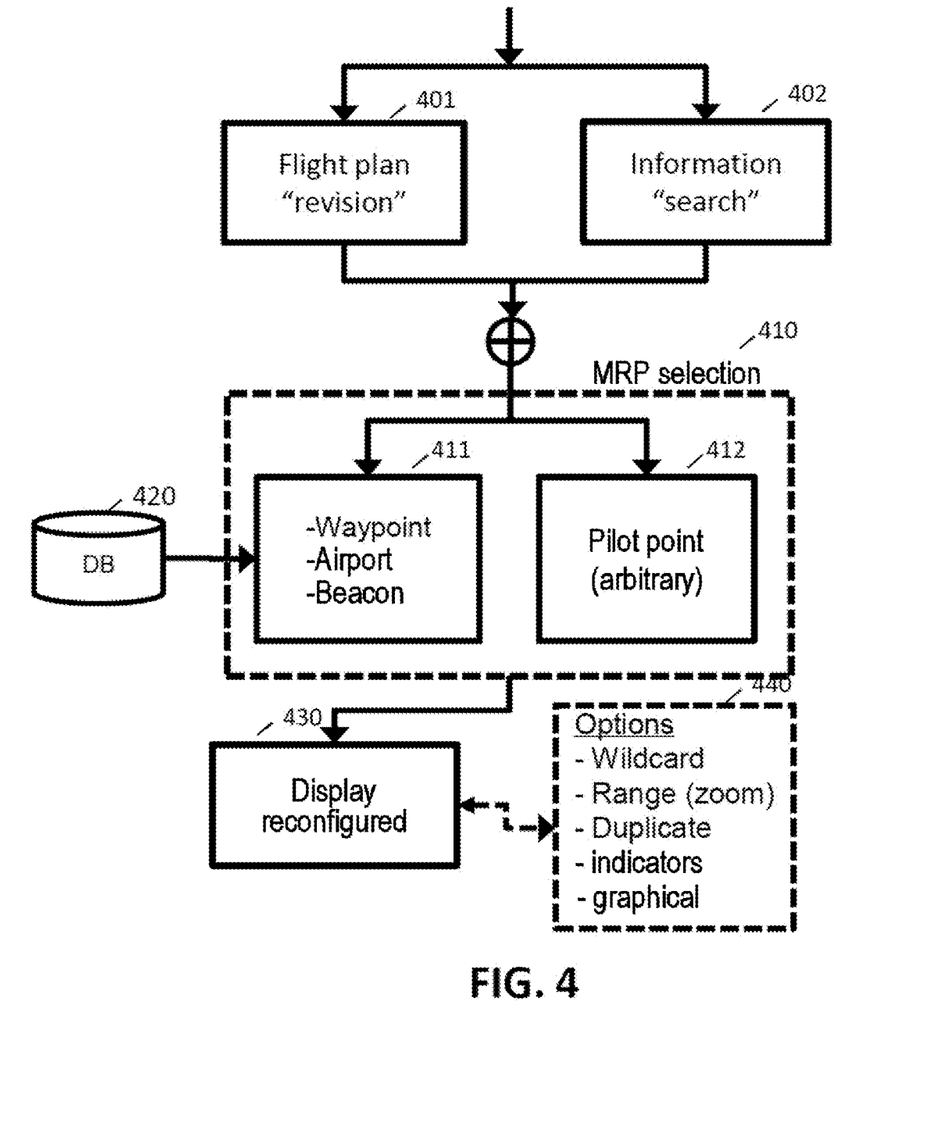
FIG. 4 illustrates examples of reconfiguration of the display, according to various embodiments of the invention.

FIG. 4 illustrates examples of reconfiguration of the display, according to various embodiments of the invention. In a context 401 (revision of the flight plan) or 402 (information search by the pilot), after the determination 410 of a so-called MRP point, the display is reconfigured 430 according to options 440.

The MRP point ("reference point" or "Map Reference Point") according to the invention can correspond to a waypoint 411 of the flight plan, but not solely. An arbitrary point 412 displayed on the map (or generally on the flight screens), or else created manually for example by means of a click on the screen, can be selected. Various elements can be selected from the FMD or the NTD to define this MRP.

The pilot can access the options for reconfiguring the display in several ways, several examples of which are described hereinafter. Several contexts of access or of arrivals in the mode of (reconfiguration of the) viewing of the flight plan according to the invention are conceivable.

A first context 401 corresponds for example to the revision of a flight plan (e.g. modification of the flight plan in the aeronautical context, for example according to the AEEC ARINC 702 standard). In this example, the flight plan concerned is displayed and an arbitrary point of the flight plan can be selected.

A second context 402 making it possible to access the viewing according to the invention may be dubbed "Search" and corresponds to an information search on the part of the pilot (for example a "data_Waypoint, data_Navaids or Data_Airport" page or according to a new dedicated page within the FMS). For example, the data to be sought can be those included in the AEEG ARING #424 international standard (waypoints, procedures, airports, radionavigation beacons, etc.), but more generally, the search function can be applied to any element present in a database.

In this context, according to a particular embodiment, a menu can allow the pilot to specify the name of the flight plan to be displayed, which flight plan may serve during the interactions with the system. The system can then propose a default flight plan or the pilot can choose another flight plan of his choice in at least one dedicated selection zone. The choice of the default flight plan can for example be stored in a configuration file. The last value selected by the pilot can also be used for the next switch to the new so-called "Data_Plan" mode or to a "Search" mode. Different flight plans can be selected (for example by radio buttons).

In the detail of another possible implementation, the MRP "in progress" and the various other waypoints can be displayed line by line on the FPLN page of the FMD. The pilot, by sliding the information of the flight plan over the textual display, can select a new MRP and therefore centre the display around this new choice. For example, by placing the 10th point of the flight plan on the 2nd line of the FPLN, the pilot centres the graphical display on this point, thereby making it possible to view his environment (trajectory around this point and/or the elements such as airports, navigation beacons, etc.).

In the "search" mode, a particular management of duplicates is described hereinafter. To revise the flight plan or in other contexts, the elements of the navigation database (such as the waypoints, beacons or airports) may be searched for by the pilot. The latter then inputs all the letters of the element sought (according to the prior art). It then frequently happens that the name input by the pilot corresponds to several distinct elements of the database (names are limited to 5 characters). In this case, the FMS displays the DUPLICATE page while listing the names of the elements (which names are all identical) as well as the position of each of them in textual Latitude/Longitude form. The elements are sorted in order of increasing distance from the aeroplane, the closest elements being displayed above the elements furthest away. The pilot is then in charge of selecting the element so that the system terminates the revision if appropriate. Stated otherwise, the structuring of the database and the mode of search may give rise to the appearance of numerous duplicates, so that when the pilot wishes to change the display in progress, numerous manual operations are required (for example, the centring of the ND display on a point of the flight plan obliges the pilot to switch to PLAN display mode on the ND, to insert this waypoint into one of the flight plans, and to position this waypoint on the 2nd line of the FPLN page of the FMD, while having if need be selected the waypoint from among duplicates after a search by "Wildcard" if appropriate).

The current FMS system does not offer the pilot any means of checking that the element that he will select from the "DUPLICATE" list corresponds to the one he wishes to use: the pilot is constrained to consult a paper or electronic map so as to verify the position of the element before selecting it on the DUPLICATE page. This leaves room for the error and overloads the pilot. Sorting by increasing distance of the elements from the aeroplane may furthermore turn out to be inappropriate, the element sought by the pilot possibly being several hundred nautical miles away (modification of the end of the flight plan, near the destination, for a transoceanic flight plan for example). The complete name of an element does not suffice to resolve all ambiguities. Generally, it is only once the revision has been carried out that the pilot can graphically check that he was not mistaken.

An extended search of Wildcard type allows the pilot to input just part of the name of an element. The possible options are: a) no use of any special character requesting an extended search, the extended aspect applying to all searches. The inputting of a series of characters searches for all the elements which begin with these characters, terminate with these characters or contain this character string (configurable options); b) an extended search specified by the pilot when there is use of a special character in the name. The special character may be placed at the start, in the middle or at the end of the characters input by the pilot. The special character may moreover be used several times. On the other hand, if this special character does not appear in what the pilot has input, only the elements whose name is exactly the same as what the pilot has entered will form part of the result of the search. The choice of type of search can be parametrizable, and the preferred choice stored in a configuration file on startup.

In one embodiment, the pilot can select one or more reference points, other than the position of the aeroplane, to sort the list of duplicates. The pilot for example can choose his sorting option by means of a dedicated menu, the chosen point as well as his position appear on the DUPLICATE page. Various options are possible, these options being selectable by the pilot and the system proposing a default preferred parametrization stored in CMI: position of the aeroplane, destination airport, MRP, the point of centring of the new Data_Plan mode when the latter is active. The pilot can also ask to centre the ND in Data_Plan mode with this reference point, by virtue of a graphical means (for example, a button).

A great variety of options associated with the reconfiguration of the display 440 are possible, notably by "Wildcard" search, by means of graphical indicators, by specifying the "range" options (zoom values, etc). Various improvement options for the "range" (e.g. zoom values) can indeed be defined by prior configuration of various values.

In a "DATA_Plan" mode, the pilot can select as MRP an element displayed on the FMD from among the following elements: (a) an element of the DUPLICATE page, allowing the pilot to verify that this is the appropriate element (by a visual check of the point with respect to the trajectory of the flight plan or of another element displayed on the ND). For example, the pilot selects the element by clicking or designating a graphical interface means associated with the element (in the example hereinbelow, by clicking on or by passing the pointer over the Lat/Long coordinates of the point in question). This preselection may have the effect of centring the element on the ND by using a dedicated symbol and of identifying in the list of the DUPLICATE page the element by another graphical means (for example, change of the colour of the font, of the background of the name); (b) an element of the flight plan on the FPLN page so as to centre it on the NTD. This makes it possible to modify the flight plan and/or the trajectory from the graphical mode. Acting as a shortcut, in 2 clicks the waypoint is placed at the centre of the ND without placing the waypoint on line 2 of the FPLN page and without changing the mode of display of the ND; (c) an element of the navigation database during a consultation (Data_x pages, where x is a Waypoint, Navaid, Runway, AAR route or a Drop Pattern). The pilot can thus use this element on the ND and access a contextual menu allowing the modification of the flight plan, of the trajectory or of the pilot database (OMD) without inserting the element into a flight plan.

According to another example of access to the reconfiguration of the display, the pilot can also select one or more elements on the ND to open the "Data_Plan" mode from among (i) a data option (mode of presentation on the ND of elements of the navigation database such as for example waypoints, airports, radionavigation beacons); (ii) a point of the flight plan and (iii) the position of the place where the pilot has clicked on the ND (the system then creates a point termed the "pilot point" 412 whose coordinates correspond to the place of the click or of the touch-sensitive designation on the map).

It is stressed that an arbitrary zone of the display (in the global sense) can be selected. In addition to the points or zones or surfaces that are predefined, the pilot can interact with one or more points of his choice. An element can therefore be "created" manually e.g. "on the fly" by the pilot (for example by a click with the mouse or by a manual designation of a zone of the touchscreen).

In particular, it is possible to select an element in correspondence with an element originating from another system. This correspondence between portions of the graphical display may be established "a priori", i.e. the correspondence is established previously, or else "a posteriori" i.e. after designation proper. By way of example, it is possible to display on the ND a weather element such as a cloud detected by an onboard weather computer, the radar echo of an aeroplane in proximity such as received by the TCAS traffic computer, a geographical element, such as a town, displayed by an EFB or a tablet, a terrain element arising from a terrain monitoring computer, etc.

Figure 5:
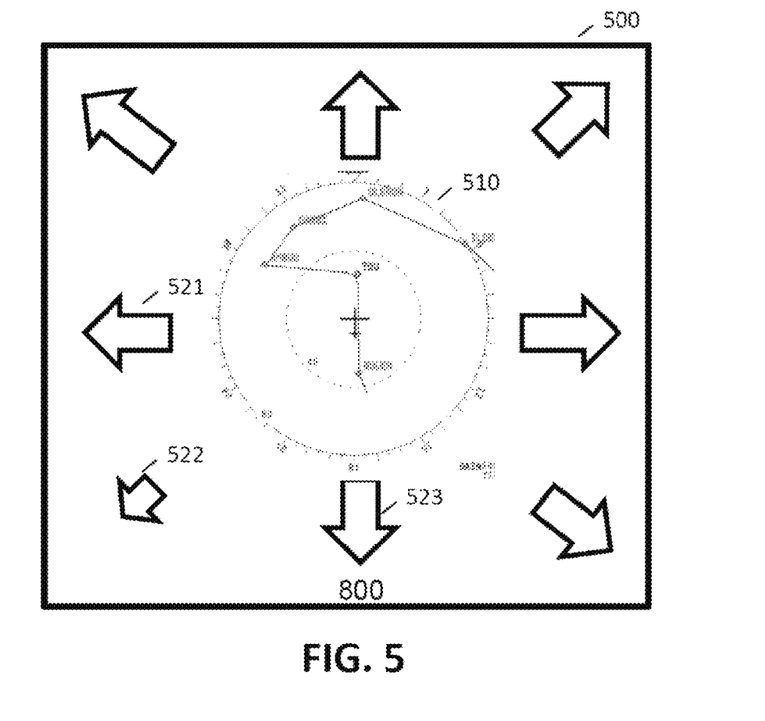
FIG. 5 illustrates an advantageous display option.

FIG. 5 illustrates an advantageous display option. In certain cases, the elements of interest 800 may be situated outside of the display frame. Graphical indicators such as arrows 521, 522 or 523 (and the like) may make it possible to give the direction (and the distance, for example displayed under the arrow 523, or symbolized by a smaller arrow size 522) of these off-display elements 800.

Stated otherwise, the waypoints which are situated outside of the display zone of the ND can be demarcated by graphical indications. A graphical indication makes it possible to give the direction of the element or elements which do not appear on the display. In order not to overload the display, the indication can feature every 45° (other values are possible).

In one embodiment, when the pilot selects (for example by touching the screen) one of these indications, the list of points concerned or a series of options can be displayed. Still via the touch-sensitive interface, by removing his finger or by confirming the selection in progress, the pilot can centre the display on the selected point. In an example, when the pilot selects an indication (for example the "SOUTH" arrow 523), the list of waypoints that are in this direction appears.

Another option (not represented) consists in establishing a contextual ("linking") menu. The "Data_Plan" mode indeed introduces the possibility of referencing two graphical elements on the ND: 1) the MRP reference point (at the centre of the ND) and 2) an element displayed on the map (MAP). This makes it possible to open a contextual menu ("linking menu") of revisions between these two elements. This is a shortcut for certain functions. The element selected by the pilot can possibly be a point of the flight plan or an element of the "data options" displayed or Latitude/Longitude information corresponding to the place on the MAP where the pilot has clicked, or else an element provided by another system. In a very particular case, the centring point or MRP selected can correspond to an element originating from a system other than the FMS, this point being able to serve to interact with the FMS.

Other advanced functionalities (not represented) may be implemented. A new interaction to re-enter the ATC report points (so-called FIX INFOS) can in particular make it possible to centre the "Reference Point" of a FIX_INFO, and therefore to test several radials and several distances. A graphical means (for example by means of a grey button with the label "LOCATE") can make it possible to ask to switch to "DATA_Plan" mode centred on the REF Waypoint of the FIX_INFO function. According to another advanced option, the reference airports of the "Equi-Time Point" function can also be selected by the pilot to implement the "DATA_Plan" mode. According to another advanced option, the linking menu can make it possible to insert the MRP into the flight plan in relation to the element of the flight plan selected (before/after) or to replace the element of the flight plan selected by the MRP. Finally, a "What_If" option can make it possible to aid the decision by centring the display on a point of interest in order to verify the weather map, the air traffic, and the availability of airport services before insertion into the flight plan.

Figure 6:
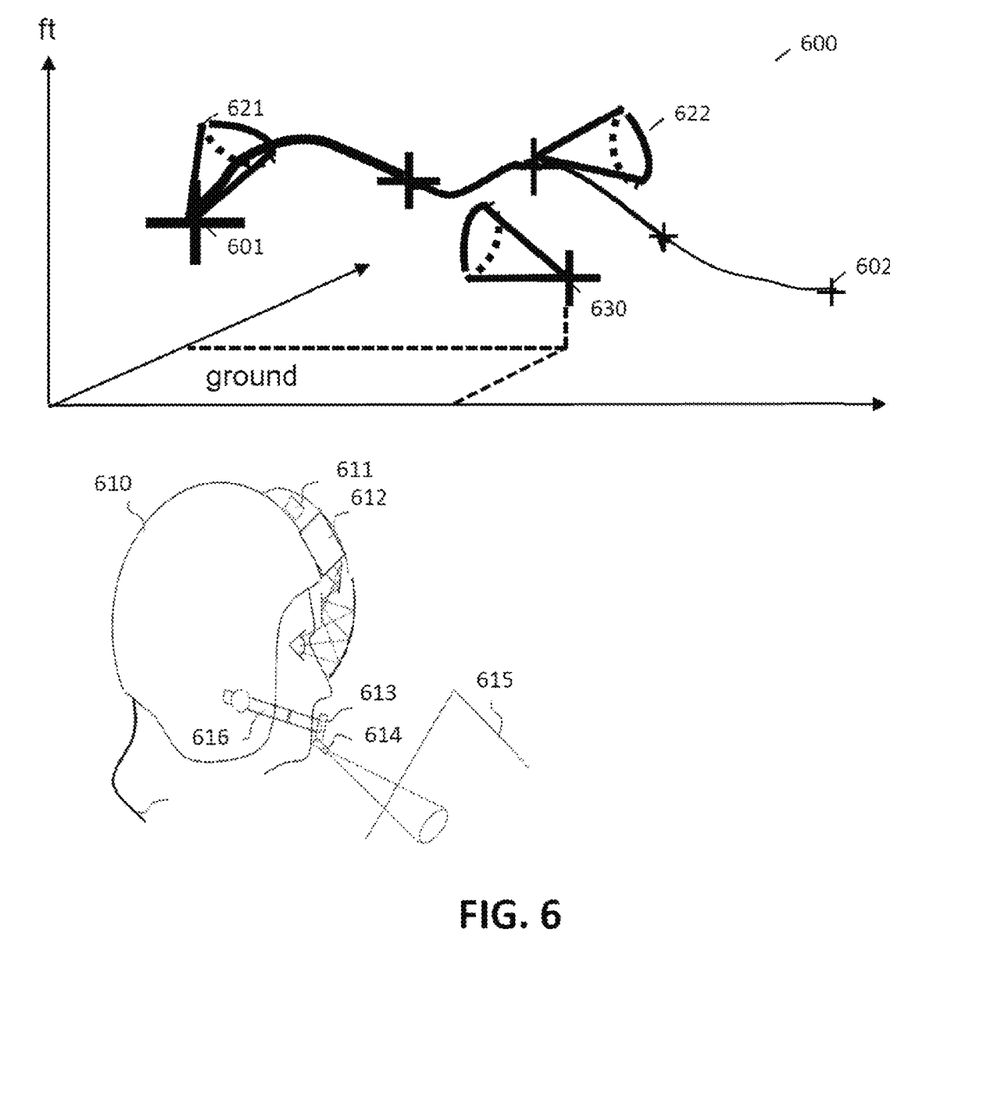
FIG. 6 illustrates various aspects relating to the MMIs for implementing the method according to the invention.

FIG. 6 illustrates various aspects relating to the MMIs for implementing the method according to the invention. By way of supplement to—or substitute for—the screens of the FMS and/or EFB onboard computer, additional MMI means may be used. Generally, FMS avionics systems (which are systems certified by the air regulator and which may exhibit certain limitations in terms of display and/or ergonomics) may advantageously be supplemented with non-avionics means, in particular advanced MMIs.

In particular, the said man-machine interfaces can make use of virtual and/or augmented reality headsets. The figure shows an opaque virtual reality headset 610 (or a semi-transparent augmented reality headset or a headset with configurable transparency) worn by the pilot. The individual display headset 610 can be a virtual reality (VR) headset, or an augmented reality (AR) headset or a high sight, etc. The headset can therefore be a "head-mounted display", a "wearable computer", "glasses" or a video headset. The headset can comprise computation and communication means 611, projection means 612, audio acquisition means 613 and video projection and/or video acquisition means 614 (for example use for the "scraping" of data accessible in an analogue manner from the cockpit or the flight cabin of the aircraft). In this way, the pilot can—for example by means of voice controls—configure the viewing of the flight plan in three dimensions (3D).

FIG. 6 represents such an example of 3D viewing of a flight plan, such as accessible to the pilot by means of the headset 610. The position of the aircraft in progress is indicated by the point marked 601. Various intermediate waypoints are represented and the final destination point is marked 602. By means of suitable interfaces the pilot can determine one or more viewing perspectives represented for example by the cones 621 and 622. In a 2D embodiment, the pilot can reconfigure the display (e.g. recentre) on the basis of an arbitrary point in space. In a 3D embodiment, the pilot can reconfigure the display (e.g. determine the perspective portrayed by a solid angle) on the basis of an arbitrary point in space 630 (e.g. freely selected).

The information displayed in the headset 610 may be entirely virtual (displayed in the individual headset), entirely real (for example projected onto the plane surfaces available in the real environment of the cockpit) or a combination of the two (in part a virtual display superimposed or merged with reality and in part a real display via projectors). The display can also be characterized by the application of predefined rules of emplacement and rules of display. For example, the man-machine interfaces (or the information) may be "distributed" (segmented into distinct portions, optionally partially redundant, and then apportioned) between the various virtual screens (e.g. 610) or real screens (e.g. FMS, TAXI).

The various steps of the scheme can be implemented entirely or in part on the FMS and/or on one or more EFBs. In a particular embodiment, all the information is displayed on the screens of the FMS alone. In another embodiment, the information associated with the steps of the scheme is displayed on the onboard EFBs alone. Finally, in another embodiment, the screens of the FMS and of an EFB may be used jointly, for example by "distributing" the information over the various screens of the various apparatuses. A spatial distribution of the information performed in an appropriate manner can contribute to reducing the cognitive load of the pilot and thereby improve decision-taking and increase flight safety.

The present invention may be implemented on the basis of hardware and/or software elements. It may be available in the guise of a computer program product on a computer readable medium. The medium may be electronic, magnetic, optical or electromagnetic. The computing means or resources may be distributed ("Cloud computing").

The invention claimed is:

1. A computer-implemented method for a display of information relating to a flight of an aircraft, comprising the steps of:
   receiving an indication of selection of any display area on a screen of an on-board computer on the aircraft, the selected area determined according to a flight phase of the aircraft;
   in response to said indication, reconfiguring the display, the reconfiguring comprising an application of display rules; and
   receiving an instruction for automatically deactivating the reconfiguration of the display, said instruction being determined according to the flight phase or according to a detection of a predefined event during the flight.

2. The method according to claim 1, the step of reconfiguring the display comprising one or more geometric transformations for at least one portion of the display, said geometric transformations being chosen from a displacement, an isometry, a similitude, an affine transformation, a homographic transformation and/or an inversion.

3. The method according to claim 1, the step of reconfiguring the display comprising one or more geometric transformations for at least one portion of the display, said geometric transformations being chosen from cropping, enlargement, reduction, coloration or modification of contrast.

4. The method according to claim 3, a value of the enlargement being controllable by means of selectors and/or rotary contacts.

5. The method according to claim 1, the step of reconfiguring the display comprising one or more geometric transformations for at least one portion of the display, said geometric transformations being chosen from a bidifferentiable transformation or diffeomorphism, a conformal or anticonformal transformation, an equivalent or equiareal transformation, a bicontinuous transformation or homeomorphism.

6. The method according to claim 1, the step of reconfiguring the display comprising centering the display.

7. The method according to claim 6, the step of reconfiguring the display comprising reconfiguring the display in relation to a predefined area associated with the selected area.

8. The method according to claim 7, the predefined area being the selected area.

9. The method according to claim 1, the display area being associated with a third-party system to the aircraft.

10. The method according to claim 9, the third-party system to the aircraft being a system chosen from a ground taxiing computer, a ground client item of equipment, a maintenance item of equipment, a terrain and/or traffic monitoring system and/or a meteorological system.

11. The method according to claim 7, the selected area being a revision of a flight plan.

12. The method according to claim 11, further comprising a step of receiving an instruction for deletion and/or for insertion of said revision of the flight plan.

13. The method according to claim 1, said instruction being received from a pilot by voice control or by means of an actuator.

14. The method according to claim 1, the selection of the display area being obtained by an input of an alphanumeric identifier.

15. The method according to claim 1, the selection of the display area being carried out by touch-sensitive selection and/or voice control.

16. A computer program product, comprising code instructions allowing the steps of the method according to claim 1 to be carried out when said program is executed on a computer.

17. A system comprising means for implementing one or more steps of the method according to claim 1.

18. The system according to claim 17, comprising avionics means, of Flight Management System type, and/or a ground taxiing computer of Airport Onboard Function or Airport Navigation Function type.

19. The system according to claim 18, comprising a screen of Navigation Display type and the display reconfiguration being carried out in a mode called DATA_PLAN.

20. The system according to claim 17, comprising non-avionics means, of Electronic Flight Bag type.

21. The system according to claim 17, the screen being a screen of man/system interface type.

22. The system according to claim 17, comprising augmented and/or virtual reality means.

23. The system according to claim 22, the reconfiguration of the display being carried out in three dimensions.

* * * * *